(12) United States Patent
Špička et al.

(10) Patent No.: US 7,199,541 B2
(45) Date of Patent: Apr. 3, 2007

(54) METHOD OF CONTROLLING AN ELECTRIC MOTOR WITH OSCILLATING OUTPUT SHAFT, PARTICULARLY FOR AUTOMOBILE WIPER SYSTEMS, AND THE ARRANGEMENT OF THAT ELECTRIC MOTOR

(75) Inventors: Jaroslav Špička, Nové Město nad Metují (CZ); Vladimir Šulc, Sobotka (CZ)

(73) Assignee: IQI s.r.o. (CZ)

( * ) Notice: Subject to any disclaimer, the term of this patent is extended or adjusted under 35 U.S.C. 154(b) by 0 days.

(21) Appl. No.: 11/241,979

(22) Filed: Oct. 4, 2005

(65) Prior Publication Data

US 2006/0087270 A1    Apr. 27, 2006

(30) Foreign Application Priority Data

Oct. 25, 2004    (CZ) .......................... PV 2004-1067

(51) Int. Cl.
*B60S 1/08* (2006.01)
(52) U.S. Cl. ..................................... 318/444; 15/250.12
(58) Field of Classification Search ........ 318/443–444; 15/250.001, 250.12, 250.17, 250.27, 250.31
See application file for complete search history.

(56) References Cited

U.S. PATENT DOCUMENTS

| | | | | | |
|---|---|---|---|---|---|
| 5,453,649 | A | * | 9/1995 | Blanchet ...................... | 310/71 |
| 5,860,185 | A | * | 1/1999 | Ponziani .................. | 15/250.13 |
| 5,917,298 | A | * | 6/1999 | Miller ......................... | 318/444 |
| 5,929,588 | A | * | 7/1999 | Shiah ......................... | 318/653 |
| 6,703,732 | B2 | * | 3/2004 | Grass ....................... | 310/75 R |
| 6,727,614 | B2 | * | 4/2004 | Neubauer et al. ......... | 310/75 R |
| 6,777,894 | B2 | | 8/2004 | Metz | |
| 6,801,006 | B2 | | 10/2004 | Moosmann et al. | |
| 6,851,157 | B2 | | 2/2005 | Zimmer | |

\* cited by examiner

*Primary Examiner*—Bentsu Ro
(74) *Attorney, Agent, or Firm*—Buchanan Ingersoll & Rooney PC

(57) ABSTRACT

A method for controlling an electric motor for an automobile wiper system includes a calibration curve in which data is converted into the angular value of the position of an output shaft and a correction is made depending upon a direction and magnitude of deviations. The electric motor has a stator with a lid with permanent magnets and the output shaft has a worm wheel with pole extensions of permanent magnets and a sensor of the angular position of the output shaft.

12 Claims, 6 Drawing Sheets

METHOD OF CONTROLLING AN ELECTRIC MOTOR WITH OSCILLATING OUTPUT SHAFT, PARTICULARLY FOR AUTOMOBILE WIPER SYSTEMS, AND THE ARRANGEMENT OF THAT ELECTRIC MOTOR

FIELD OF THE INVENTION

The invention filed involves a method of controlling an electric motor with oscillating output shaft, particularly for automobile wiper systems, and the arrangement of that electric motor.

DESCRIPTION OF THE PRIOR ART

Automobile wiper systems are made with motors with a rotating motion or with motors with an oscillating motion, in which the position of the output shaft is sensed at several individual angles and specification of the exact position of the output shaft is carried out by sensing the revolution of the rotor of the drive motor. A disadvantage of this solution is that the interior clearance of the motor and the gearbox affect the position of the output shaft, it is not sufficient to add up the information in order to control the angular velocity of the motor, and it is difficult to achieve a harmonic curve for the motion of the wiper. A disadvantage of this solution for sensing the position of the output shaft is also its complexity, given the large number of sensing elements and the difficulty of assessing the data, which are subject to errors caused, for example, by manufacturing inaccuracies in the sensing systems. A further disadvantage lies in the actual construction of the motor, during which it is difficult to attain the necessary alignment of the three bearings in which the rotor is positioned, whence the need for a bigger air gap between the stator and the rotor, thus reducing the magnetic flux and thereby also the moment of the motor. A further disadvantage is the considerable weight of the motor, due to the use of ferrite magnets and their low magnetic flux, requiring a large and heavy rotor. However, this rotor also has a considerable moment of inertia, which is a disadvantage in a motor that frequently stops and starts. Another disadvantage of the current solutions is the use of non-reinforced plastics for the material of the worm wheel. These wheels must be large, for reasons of solidity, which leads to an increase in the dimensions and weight of the wiper motor.

SUMMARY OF THE INVENTION

The subject of this invention is the construction of an electric motor and a method of controlling an electric motor with oscillating output shaft, particularly for automobile wiper systems. The basis of the invention lies in the fact that the output shaft of the motor swings first to one end stop, the direction of the rotation of the motor then changes, whereupon the output shaft is returned at a constant speed to the opposite stop, whilst in the same pre-selected constant time intervals its angular position is measured between the two stops; taking into account the size of the angle between the two stops, the measurement data on the angular position are converted into angle increments in individual, measured, constant time intervals. A calibration curve is made of the sensor used for measuring the angular position of the output shaft of the motor and from this calibration curve is then determined the absolute value of the output variable of the sensor used, for any angle of the actual position of tile output shaft of the motor, whereupon the required time behaviour of the angular position of the electric motor is determined, and then continuously at certain time intervals depending upon the required number of swings per time unit, data on the angular position of the output shaft of the motor are taken. In accordance with the calibration curve the data are converted into the actual angular value of the position of the output shaft, and if a deviation is discovered from the required time behaviour at any given moment, a correction is made in the speed of the electric motor depending upon the direction and magnitude of this deviation. The process of correction of deviations in the angular positions is carried out continuously after each measurement of the angular position of the output shaft of the motor. By changing the individual time interval for sensing the angular position of the output shaft of the motor and by its control and correction, the number of swings of the electric motor in the time unit can easily be changed.

The advantage of setting the required time behaviour of the angular position of the electric motor is the fact that it is possible to set it so that the end motion of tile wiper blade is harmonic, with the result that the blade turns over smoothly without any irritating noise. If a lever mechanism is used (the wiper system can also be without a lever mechanism, with independent motors) then mechanical shocks do not occur in it, wear and tear on the bearings and the spherical pivots of this mechanism is reduced and accumulation of play is reduced. Its lifespan is thereby lengthened. By use of the calibrating function of the angular position sensor of the output shaft of the motor, greater manufacturing tolerance is permitted in the material of the permanent magnets of the sensor, in their mechanical execution, in the mechanical execution of tile pole extensions and also greater manufacturing tolerance in the sensor. It is also a significant advantage that the electronic control unit of the motor is able to evaluate and simultaneously adjust the required angular positions of the wiper, for example to adjust the resting positions especially for the summer and winter seasons or the turn-over of the wiper in the end positions to reduce wear and tear on the wiper blades, or to change the wiper angle depending upon the speed of the vehicle and during gradual removal of a heavier layer of snow etc. As the position of the output shaft of the motor is directly sensed, the play of the worm gearing can have no impact on the precise sensing of the position of the output shaft and it is possible to set the angular position of the output shaft of tile motor for every circumstance.

The subject of this invention is also an electric motor, particularly for automobile wiper systems, to whose shaft are attached a commutator and rotor sheets in which there is arranged an electrical motor winding, this shaft being connected by a worm gear to the output shaft of the motor for transfer of the torque through the lever mechanism to at least one wiper, or the wiper system can be without a lever mechanism, with independent motors. The lid of the stator is attached to the stator casing. The basis of the invention lies in tie fact that in the lid of the stator there is a magnetic circuit with inserted permanent magnets containing elements of noble earths, whilst onto the output shaft there is fixed a worm wheel to which permanent magnets with pole extensions are attached, between which, in the operating position, there is arranged a sensor of the angular position of the output shaft of the motor In another modification of this invention the magnetic circuit with inserted permanent magnets containing elements of noble earths is arranged in the stator casing of the motor, whilst onto the output shaft of the motor there is fixed a worm wheel to which are attached permanent magnets with pole extensions, or a suitably shaped magnet, between which, in the operating position, there is arranged a sensor of the angular position of the output shaft of the motor In the lid of the stator at least one bearing for positioning the shaft can be arranged in the stator casing.

The permanent magnets containing elements of noble earths consist of a material selected from a group including NdFeB, SmCo and the like.

If the stator part of the casing of the motor is an integral part of the gearbox of the motor, a marked reduction in the weight of the electric motor results. At the same time a substantially more exact positioning of the motor shaft is achieved, making possible a reduction in the size of the air gap between the rotor and the permanent magnets and an increase in the magnetic flux and torque of the motor. Another advantage is the improvement in the removal of waste heat from the rotor, which is important particularly in a motor which often reverses in tie course of its operation. It is possible to draw this heat off efficiently, through the rear sliding bearing into the lid and then into the surrounding air through the finning on die cylindrical part in which is positioned the stator circuit of the gearbox. Onto the output shaft of the motor it is possible to fix a worm wheel to which permanent magnets with pole extensions can be attached, between which, in file operating position, there is arranged a sensor of the angular position of the output shaft of tie motor, which is part of the electronic control board or the motor. This arrangement is compact. The shaft of the motor can be positioned consecutively along its length in three bearings to limit its deflection during engagement of the worm and the worm wheel of the transmission. The root diameter of the worm gradually increases in the direction of the motor winding. The engagement of the worm gearing and of the worm wheel is thus improved, the specific stresses are reduced and the effectiveness of the gearing is increased. To reduce the dimensions and improve the solidity of the worn wheel of the output shaft of the motor and at the same time reduce tie wear and tear on the worm, this wheel is made of plastic reinforced with long fibres.

The arrangement of the electric motor and the method of controlling it according to this invention are related, in any given case, to the associated features and effects. To achieve the desired properties it is necessary to adapt the structure of the motor to the means of controlling it and, conversely, to adapt the control to the character of the motor. For this reason the characteristics of the motor and the whole kinematics of the levered drive or the wiper, for example, are dependent upon the control programme of the motor. Because the motor must frequently reverse, up to one hundred and thirty times a minute, it is desirable to achieve minimal moments of inertia of the rotor. That requires the use of magnets with high magnetic flux, but at the same time it calls for mechanical exactitude in the motor. The mechanical construction of the electric motor in this case determines its control possibilities (the means of sensing the angular position of its output shaft).

BRIEF DESCRIPTION OF THE DRAWINGS

For a better understanding the invention is illustrated in the attached drawings, FIGS. 1A, 1B and 1C being schematic illustrations in cross section of part of the electric motor whose stator casing is an integral part of tile gearbox and is in the shape of an open cylinder into which is inserted, or to which is attached the lid of the stator with a sliding bearing. Into the cylindrical part is inserted a magnetic circuit consisting of a steel pipe with permanent magnets containing elements of noble earths inserted in it.

EXAMPLES OF PREFERRED EMBODIMENTS

Figure 1A:
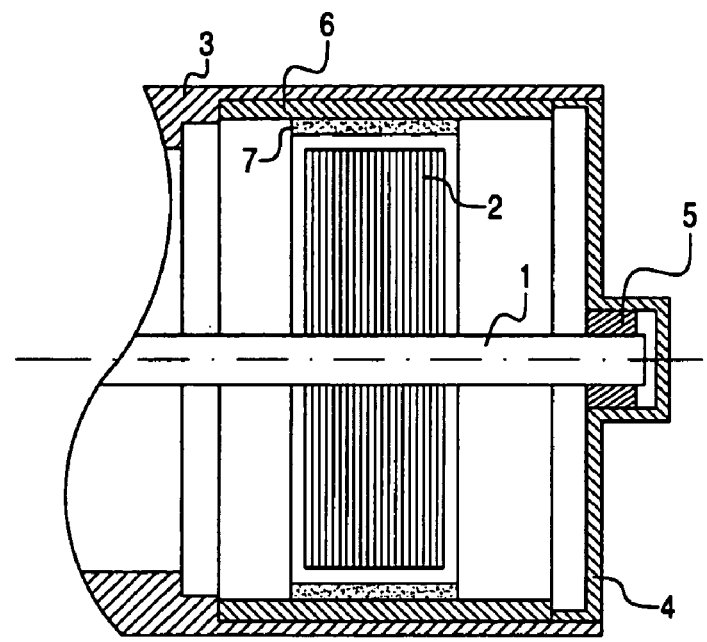

The shaft 1 of the electric motor of the automobile wiper is connected by a worm gear to the output shaft 8 of this motor. The angular position sensor of the output shaft of the motor, consisting for example of permanent magnets and pole extensions, is arranged on the worm wheel (made of metal or plastic reinforced with long fibres). The sensor of the angular position, for example a Hall or a magneto-resistive sensor or the like, is part of the electronic control board of the motor and in its operating position is inserted between the pole extensions. The shaft 1 is positioned consecutively along its length in three bearings in order to limit its deflection during engagement of the worm and the worm wheel of the transmission. For the same reason the root diameter of the worm gradually increases in the direction of the electrical motor winding, so as to achieve maximal flexural rigidity of the shaft. The engagement of the worm gearing and of the worm wheel is thus improved, the specific stresses are reduced and the effectiveness of the gearing is increased. A commutator and the rotor sheets 2 of the electric motor, in which is arranged the electrical winding of that motor, are pressed onto the shaft 1. The yoke of the rotor sheets 2 is reinforced. The gearbox is made in one piece with the motor casing 3, which is executed as an extension of the gearbox and is in the shape of an open cylinder into which is inserted the lid 4 of the stator with a sliding bearing 5. In the cylindrical part of the casing 3 there is a magnetic circuit 6 consisting of a steel pipe with inserted (glued) permanent magnets 7 containing elements of noble earths, for example NdFeB (neodymium-iron-boron) inserted (glued) into it. Alternatively, the permanent magnets 7 can be positioned in the lid 4 of the stator (see FIG. 1B) which, with its reinforced part, is more deeply inserted into the casing 3 of the motor. In this case it is not necessary that the magnetic circuit 6 consisting of a steel pipe be inserted into the cylindrical part of the casing 3 (although this is possible).

The output shaft (8) of the electric motor swings first to one end stop, the direction of the rotation of the motor then changes, whereupon the output shaft (8) is returned at a constant speed to the opposite stop, while in the same pre-selected constant time intervals its angular position is measured between the two stops. Taking into account the size of the angle between the two stops, the measurement data on the angular position are converted into angle increments in individual, measured, constant time intervals and a calibration curve is thus made of the specific sensor used for measuring the angular position of the output shaft (8) of the motor. From this calibration curve is then determined the absolute value of the output variable of the sensor used, for any angle of the actual position of the output shaft (8) of the motor, whereupon the required time behavior of the angular position of the electric motor is determined, and then continuously at certain time intervals depending upon the required number of swings per time unit, data on the angular position of the output shaft (8) of the motor are taken. In accordance with the calibration curve the data are converted into the actual angular value of the position of the output shaft (8), and if a deviation is discovered from the required time behavior at any given moment, a correction is made in the speed of the electric motor depending upon the direction and magnitude of this deviation.

The stator casing (3) of the motor is part of its gear box (for example, its extension) and is in the shape of an open cylinder, into which is inserted the lid (4) of the stator with a bearing (5) for positioning one end of the shaft (1). Into the casing (3) is inserted a magnetic circuit (6) consisting of a steel pipe with inserted permanent magnets (7) or of a stator lid (4), while onto the output shaft (8) of the motor there is fixed a worm wheel to which permanent magnets with pole extensions are attached, between which, in the operating position, a Hall sensor of the angular position of the output shaft (8) of the motor is inserted.

In another modification the lid 4 of the stator (see FIG. 1C) can be attached to the casing 3 of the motor, for example screwed or pressed on the magnetic circuit in this embodiment consists of a lid 4, into which a magnetic circuit 6 can be (but is not necessarily) inserted, or it can consist, as in FIG. 1A, of a steel tube 6 inserted into the lid 4. The permanent magnets 7, placed in the steel tube of the magnetic circuit 6, or in the lid 4 of the stator, contain elements of noble earths, for example NdFeB (neodymium-iron-boron), SmCo (samarium-cobalt) and the like.

Figure 1B:
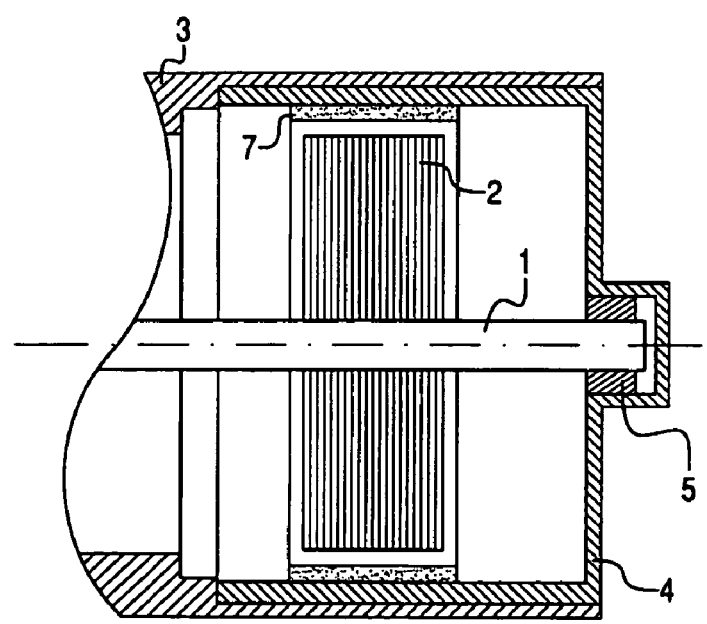
Figure 1C:
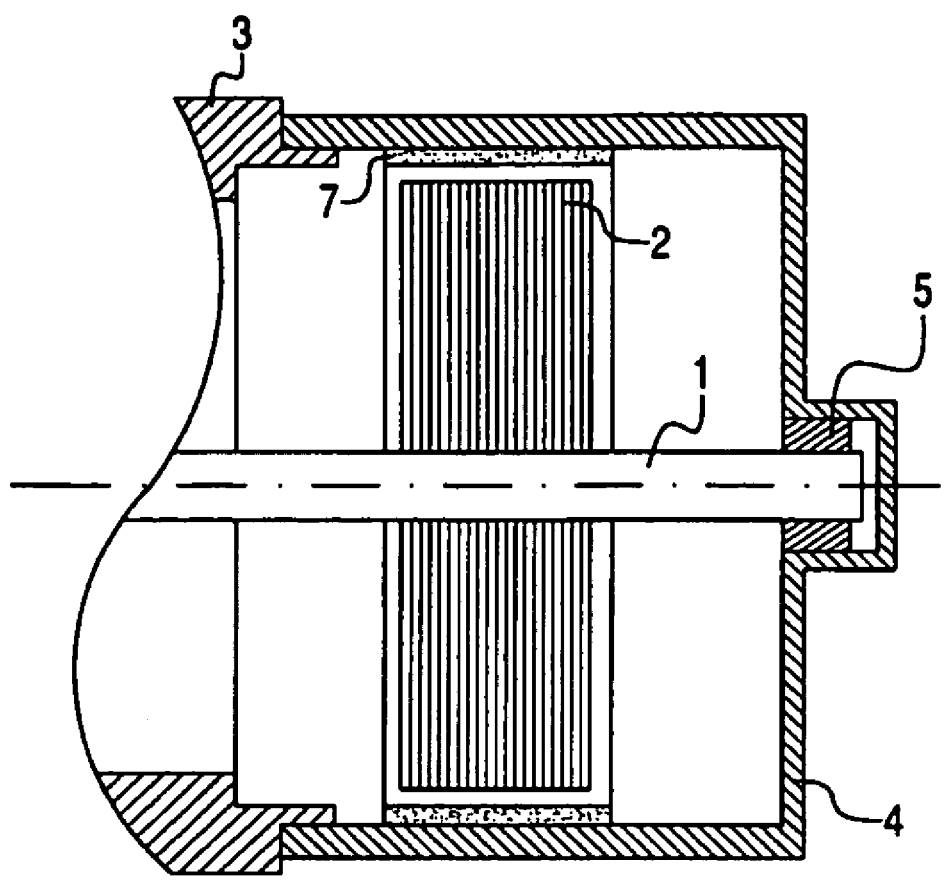
Figure 2:
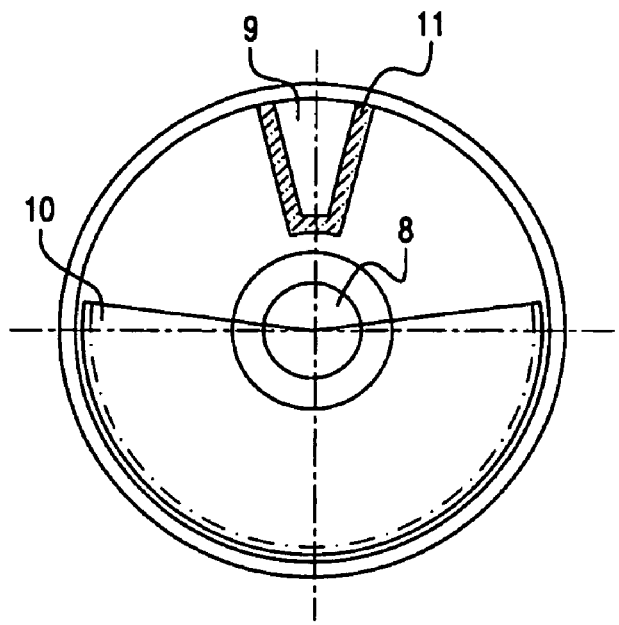
FIG. 2 shows a forward view in the direction or the axis and in FIG. 3 the gearing segment of the worm wheel of the output shaft and the stop are illustrated in side view, the angular position sensor of the output shaft of the motor, consisting for example of permanent magnets and pole extensions, is arranged on the worm wheel.
Figure 3:
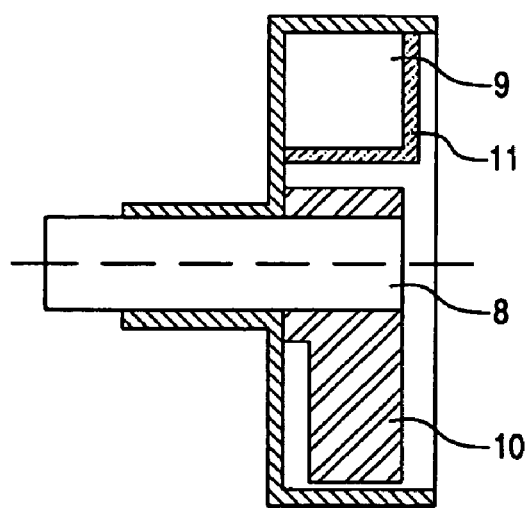
Figure 4:
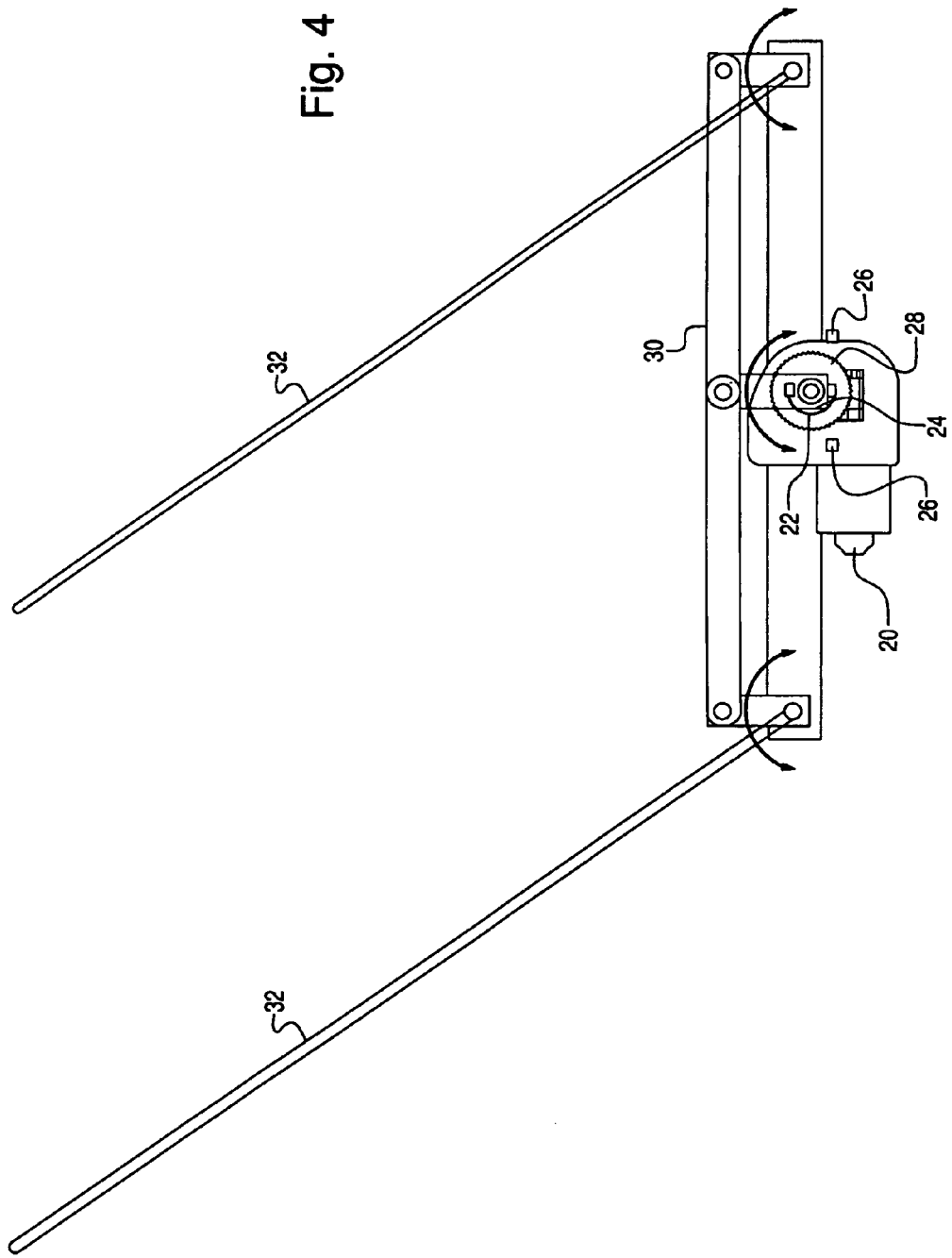
FIG. 4 is a schematic drawing of an automobile wiper system with an electric motor according to a preferred embodiment of the present invention.
Figure 5:
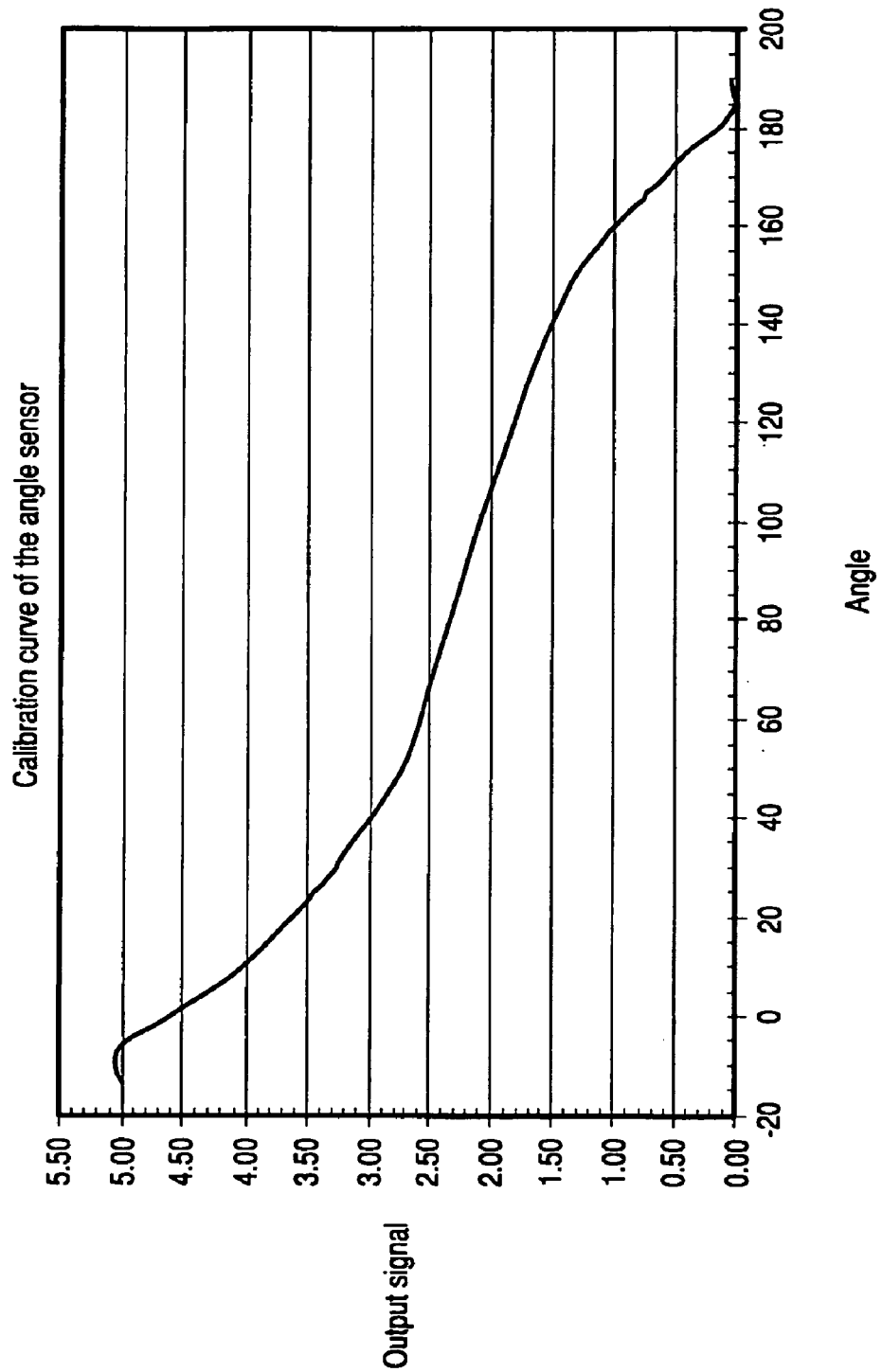
FIG. 5 is a representative graph of a typical calibration curve of the angle sensor for the electric motor according to a preferred embodiment of the present invention.
Figure 6:
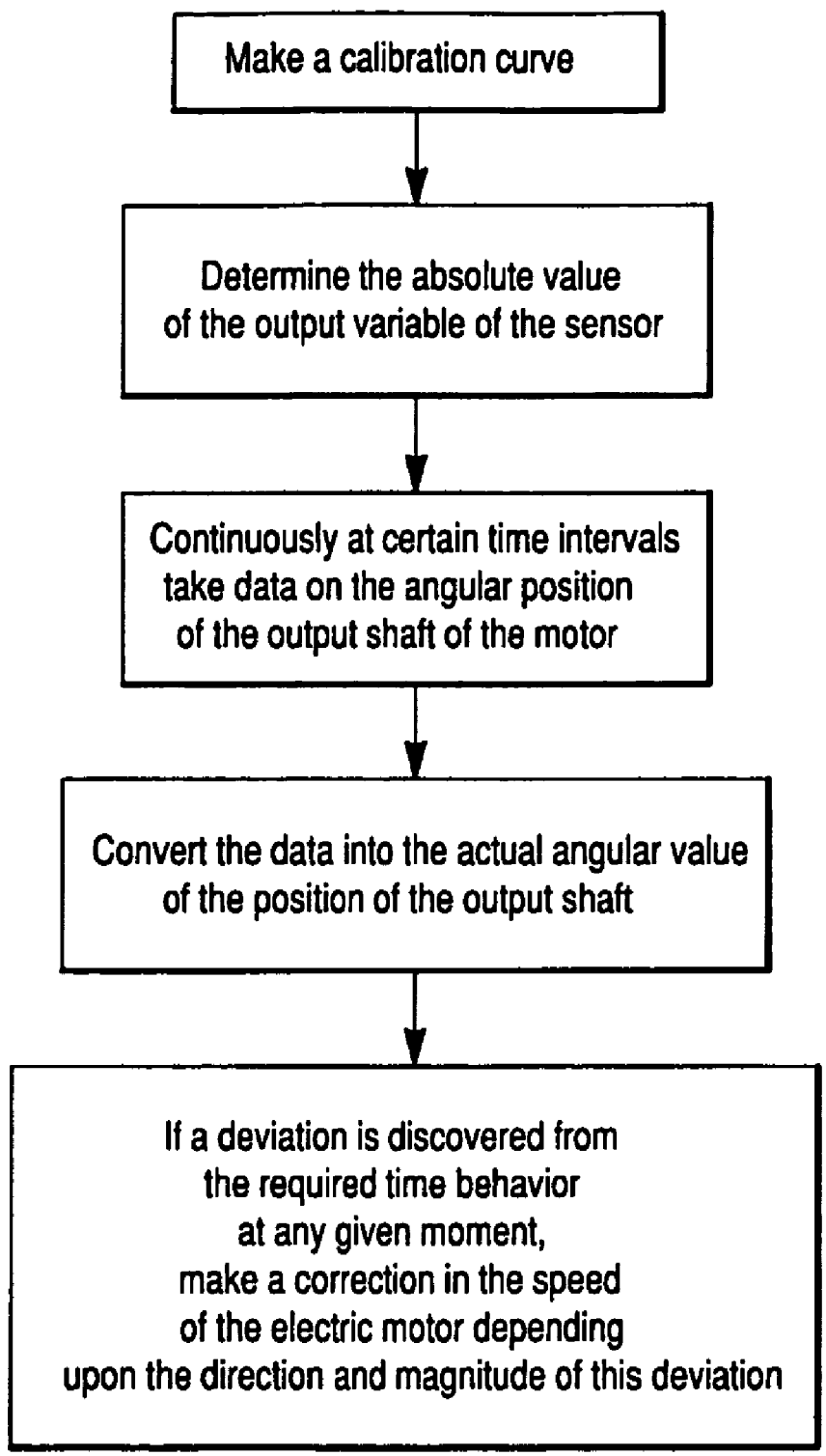
FIG. 6 is a schematic flow chart of a method for correcting the speed of the electric motor depending upon a deviation in the time behavior of the electric motor according to a preferred embodiment of the present invention.

By the arrangement according to FIGS. 1A and 1B, a substantially more exact positioning of the motor shaft 1 is achieved and it is also possible to reduce the air gap between the rotor and the magnets 7 and thus to increase the magnetic flux and the torque of the motor. The magnetic flux is also increased in the air gap, whereby the specific torque of the motor is increased and its size for a given output is reduced. The oscillating movement of the output shaft 8 of the electric motor is limited by a mechanical stop 9, which can be an integral part of the motor casing 3. The worm wheel consists of a geared segment 10 whose lateral sides in the extreme positions bump individually into the lateral sides of the stop 9. The stop 9 can be furnished on its surface with a silencing layer 11, for example of soft plastic or rubber. The connector of the electric motor (not illustrated) can at the same time be an electronic control board. It offers a technological advantage in reducing the production costs of the system, both during manufacture of the individual electronics and during assembly in the motor. This gives rise, moreover, to two independent units which can be tested separately, thus increasing the quality of the resulting product. The electric wiper motor swings first to one end stop (which consists of a mechanical stop, but can also be an optical or magnetic stop), the direction of the rotation changes and it returns at a constant speed to the opposite stop. In the same preselected constant time intervals its angular position is measured between tile stops and, taking into account the size of the angle between the two stops, the measurement data on the angular position are converted into angle increments in individual, measured, constant time intervals. A calibration curve is made of the sensor used for measuring the angular position of the output shaft of the motor and from this calibration curve is then calculated the absolute value of the output variable (voltage) of the sensor used, for any angle of the actual position of the output shaft of the motor.

In order to achieve a harmonic end motion of the wiper, that is smooth starting and stopping without shocks during the direction change, the required time behaviour of the angular position of the electric motor is determined first of all in relation to the kinematics of the lever mechanism of the wiper system. Then continuously at certain time intervals depending upon the required number of swings per time unit (generally swings per minute), data on the angular position of the output shaft of the motor are taken, in accordance with the calibration curve the data are converted into the actual angular value of the position of the output shaft, and if a deviation is discovered from the required time behaviour at any given moment, a correction is made in the speed of the electric motor depending upon the direction and magnitude of this deviation. This process of correction of deviations in the angular positions is carried out continuously after each measurement of the angular position of the output shaft of tile motor. Given that the end motion of the wiper blade is harmonic, the blade turns over smoothly without any irritating noise. Mechanical shocks do not occur in the mechanism and the wear and tear on the bearings and the spherical pivots of the lever mechanism is thus reduced. Its lifespan is thereby lengthened and accumulation of play is reduced during the lifetime of the system.

The calibrating angular position sensor of the output shaft of the motor permits the use of greater manufacturing tolerance in the material of the magnets, in their mechanical execution and also in the mechanical execution of the pole extensions of the permanent magnets, including greater manufacturing tolerance in the angular position sensor.

The number of swings of the electric motor per time unit can very easily be changed by changing the individual time interval for sensing, control and correction of the angular position of the output shaft of the motor. The fact that the electronic control unit of the motor is able to carry out a static evaluation and simultaneously adjust the required angular position of the wiper is also a significant advantage. It can be used for example to set the wiper for various resting positions (positions for the summer and winter seasons) or for turning it over in the end positions to reduce wear and tear on the wiper blades, to set it for the service position or to change the wiper angle depending upon the speed of the vehicle, by changing the upper, lower or both end positions of the wiper. Likewise, a thick layer of snow on the windscreen of the vehicle can be removed by a gradual change in the end position or in both positions. As the position of the output shaft of the wiper motor is directly and statically sensed, the play of the worm gearing can have no impact on the precise sensing of the position of the output shaft and the position of the output shaft is known in all circumstances (for example during forcible turning of the output shaft of the motor by an outside agency).

Industrial Use

The invention is designed for use particularly in automobile wiper systems.

The invention claimed is:

1. A method of controlling an electric motor with oscillating output shaft, for automobile wiper systems, characterized in that the output shaft of the motor swings first to one end stop, the direction of the rotation of the motor then changes, whereupon the output shaft is returned at a constant speed to the opposite stop, whilst in the same pre-selected constant time intervals its angular position is measured between the two stops; taking into account the size of the angle between the two stops, the measurement data on the angular position are converted into angle increments in individual, measured, constant time intervals, from which a calibration curve is made of the sensor used for measuring the angular position of the output shaft of the motor and from this calibration curve is then determined the absolute value of the output variable of the sensor used, for any angle of the actual position of the output shaft of the motor, whereupon the required time behaviour behavior of the angular position of the electric motor is determined, and then continuously at certain time intervals depending upon the required number of swings per time unit, data on the angular position of the output shaft of the motor are taken, in accordance with the calibration curve the data are converted into the actual angular value of the position of the output shaft, and if a deviation is discovered from the required time behavior at any given moment, a correction is made in the speed of the electric motor depending upon the direction and magnitude of this deviation.

2. A method according to claim 1, wherein the process of correction of deviations in the angular positions is carried out continuously after each measurement of the angular position of the output shaft of the motor.

3. A method according to claim 1, wherein by changing the individual time interval for sensing the angular position of the output shaft of the motor and by its control and correction, the number of swings of the electric motor in the time unit is changed.

4. An electric motor, for automobile wiper systems, to whose shaft are attached a commutator and rotor sheets in which there is arranged an electrical motor winding, this shaft being connected by a worm gear to the output shaft of the motor for transfer of the torque, through the lever mechanism, to at least one wiper, where the lid of the stator is attached to the stator casing of the motor, wherein in the lid of the stator there is a magnetic circuit with inserted permanent magnets containing elements of noble earths, whilst onto the output shaft of the motor there is fixed a worm wheel to which permanent magnets with pole extensions are attached, between which in the operating position, there is arranged a sensor of the angular position of the output shaft of the motor.

5. An electric motor according to claim 4, wherein the permanent magnets containing elements of noble earths consist of a material selected from a group including NdFeB and SmCo.

6. An electric motor according to claim 4, wherein in the lid of the stator at least one bearing for positioning the shaft is arranged in the stator casing.

7. An electric motor according to claim 4, wherein the stator part of the casing of the motor is an integral part of the gearbox.

8. An electric motor according to claim 4, wherein the sensor and/or the connector of the motor are part of the electronic control board of the motor.

9. An electric motor according to claim 4, wherein its shaft is positioned consecutively along its length in three bearings, in order to limit its deflection during engagement of the worm and the worm wheel of the transmission.

10. An electric motor according to claim 4, wherein the root diameter of the worm gradually increases in the direction of the motor winding.

11. An electric motor according to claim 4, wherein the worm wheel is made of plastic reinforced with long fibers.

12. An electric motor, for automobile wiper systems, to whose shaft are attached a commutator and rotor sheets in which there is arranged an electrical motor winding, this shaft being connected by a worm gear to the output shaft of the motor for transfer of the torque, through the lever mechanism, to at least one wiper, where the lid of the stator is attached to the stator casing of the motor, wherein, in the stator casing of the motor there is arranged a magnetic circuit with inserted permanent magnets containing elements of noble earths, whilst onto the output shaft of the motor there is fixed a worm wheel to which permanent magnets with pole extensions are attached, between which, in the operating position, there is arranged a sensor of the angular position of the output shaft of the motor.

* * * * *

UNITED STATES PATENT AND TRADEMARK OFFICE
CERTIFICATE OF CORRECTION

PATENT NO.        : 7,199,541 B2
APPLICATION NO.   : 11/241979
DATED             : April 3, 2007
INVENTOR(S)       : Jaroslav Spicka et al.

It is certified that error appears in the above-identified patent and that said Letters Patent is hereby corrected as shown below:

Col. 7, Claim 1, line 12, delete "behaviour".

Signed and Sealed this

Twenty-ninth Day of May, 2007

JON W. DUDAS
*Director of the United States Patent and Trademark Office*